United States Patent
Matsumoto et al.

(10) Patent No.: US 8,514,293 B2
(45) Date of Patent: Aug. 20, 2013

(54) MOVING IMAGE PROCESSING DEVICE AND METHOD FOR PERFORMING DIFFERENT IMAGE PROCESSINGS TO MOVING OBJECT REGION AND STILL OBJECT REGION

(75) Inventors: Yukako Matsumoto, Tokyo (JP); Yuko Hattori, Kawasaki (JP)

(73) Assignee: Nikon Corporation, Tokyo (JP)

( * ) Notice: Subject to any disclaimer, the term of this patent is extended or adjusted under 35 U.S.C. 154(b) by 2034 days.

(21) Appl. No.: 11/226,363

(22) Filed: Sep. 15, 2005

(65) Prior Publication Data

US 2006/0072813 A1    Apr. 6, 2006

(30) Foreign Application Priority Data

Oct. 1, 2004    (JP) .................................. 2004-290188

(51) Int. Cl.
*H04N 5/228* (2006.01)
*G06K 9/00* (2006.01)
*G06K 9/40* (2006.01)

(52) U.S. Cl.
USPC ......... 348/222.1; 382/162; 382/266; 382/118

(58) Field of Classification Search
USPC ....... 348/220.1; 382/165, 162, 266, 115–118
See application file for complete search history.

(56) References Cited

U.S. PATENT DOCUMENTS

| | | | | |
|---|---|---|---|---|
| 5,280,530 A | * | 1/1994 | Trew et al. ..................... | 382/103 |
| 5,323,470 A | * | 6/1994 | Kara et al. ..................... | 382/103 |
| 5,430,809 A | * | 7/1995 | Tomitaka ...................... | 382/173 |
| 5,751,831 A | * | 5/1998 | Ono ............................... | 382/103 |
| 5,912,980 A | * | 6/1999 | Hunke ........................... | 382/103 |
| 6,335,988 B1 | * | 1/2002 | Kondo ........................... | 382/236 |
| 6,337,917 B1 | * | 1/2002 | Onural et al. ................. | 382/107 |
| 6,903,782 B2 | * | 6/2005 | Herman et al. ............... | 348/625 |
| 6,906,744 B1 | * | 6/2005 | Hoshuyama et al. ....... | 348/223.1 |
| 7,082,211 B2 | * | 7/2006 | Simon et al. ................ | 382/118 |

(Continued)

FOREIGN PATENT DOCUMENTS

| | | |
|---|---|---|
| EP | 0 756 426 A2 | 1/1997 |
| EP | 1 376 471 A1 | 1/2004 |

(Continued)

OTHER PUBLICATIONS

Jul. 20, 2010 Office Action issued in Japanese Patent Application No. 2004-290188 (with translation).

*Primary Examiner* — Aung S Moe

*Assistant Examiner* — Amy Hsu (74) *Attorney, Agent, or Firm* — Oliff & Berridge, PLC (57) ABSTRACT

A moving image processing device includes a recognition unit, a parameter control unit, and an image processing unit. The recognition unit recognizes a moving object region or a still object region from a captured image. The parameter control unit determines a parameter for image processing of any of a color, a tone, an edge, and a noise. The image processing unit performs image processing to the captured image according to the parameter for the image processing. In this case, the image processing unit performs the image processing to all or a part of the moving object region and all or a part of the still object region, using different parameters.

10 Claims, 4 Drawing Sheets

(56) References Cited

U.S. PATENT DOCUMENTS

| | | | | |
|---|---|---|---|---|
| 7,263,220 B2* | 8/2007 | Crandall et al. | | 382/165 |
| 7,336,818 B2* | 2/2008 | Kondo et al. | | 382/164 |
| 7,409,074 B2* | 8/2008 | Kondo et al. | | 382/103 |
| 7,446,797 B2* | 11/2008 | Lee | | 348/143 |
| 7,536,049 B2* | 5/2009 | Kondo et al. | | 382/173 |
| 2002/0105662 A1* | 8/2002 | Patton et al. | | 358/1.9 |
| 2002/0131652 A1* | 9/2002 | Yoda | | 382/309 |
| 2002/0159652 A1* | 10/2002 | Izume et al. | | 382/266 |
| 2003/0198367 A1* | 10/2003 | Hartmann et al. | | 382/118 |
| 2004/0052425 A1 | 3/2004 | Kondo et al. | | |
| 2004/0160577 A1 | 8/2004 | Baba et al. | | |
| 2006/0232690 A1* | 10/2006 | Tamura et al. | | 348/242 |

FOREIGN PATENT DOCUMENTS

| | | |
|---|---|---|
| JP | A-61-085238 | 4/1986 |
| JP | A-04-216181 | 8/1992 |
| JP | A-05-167888 | 7/1993 |
| JP | A-06-311392 | 11/1994 |
| JP | A-09-081754 | 3/1997 |
| JP | A-10-021408 | 1/1998 |
| JP | A-2000-152036 | 5/2000 |
| JP | B2-3387071 | 1/2003 |
| JP | A-2003-216941 | 7/2003 |
| JP | B2-3448980 | 7/2003 |
| JP | A-2004-080252 | 3/2004 |

* cited by examiner

MOVING OBJECT    BACKGROUND

[B]

| | COLOR CORRECTION | GAMMA | EDGE ENHANCEMENT |
|---|---|---|---|
| MOVING OBJECT | SKIN COLOR TUNING | | WEAK |
| BACK-GROUND | HIGH CHROMA | | STRONG |

MOVING OBJECT  BACKGROUND

[B]

| | COLOR CORRECTION | GAMMA | EDGE ENHANCEMENT |
|---|---|---|---|
| MOVING OBJECT | HIGH CHROMA | | STRONG |
| BACKGROUND | LOW CHROMA | | INTERMEDIATE |

MOVING IMAGE PROCESSING DEVICE AND METHOD FOR PERFORMING DIFFERENT IMAGE PROCESSINGS TO MOVING OBJECT REGION AND STILL OBJECT REGION

CROSS REFERENCE TO RELATED APPLICATION

This application is based upon and claims the benefit of priority from Japanese Patent Application No. 2004-290188, filed on Oct. 1, 2004, the entire contents of which are incorporated herein by reference.

BACKGROUND OF THE INVENTION

1. Field of the Invention

The present invention relates to a device and a method for performing image processing to a moving image.

2. Description of the Related Art

A moving image captured by a digital video camera, a digital camera with a moving image shooting function, or the like is video signals containing 15 to 60 fields per second. The number of pixels per field in total of three colors (red (R), green (G), and blue (B)) is about 2 to 10 mega pixels. In order to enhance the image quality of the moving image, various processings are performed such as white balance adjustment, color correction for tuning to a desirable color, gamma correction (tone correction) for matching characteristics of the moving image with nonlinear output characteristics of output equipment (e.g., a cathode-ray tube or a monitor), edge enhancement for improving apparent resolution, a noise reduction processing.

Desirable output images for viewers are not always of faithfully reproduced colors of original colors in terms of photometry and colormetry. As for colors, it is known that there are colors called memory colors, which people prefer (typical colors of familiar objects which people tend to think of), such as a color of pure blue sky and a color of healthy skin. Parameters for image representation include a color as described above, a tone (gamma), an edge, and so on. People's preference for colors differs depending on subjects. For example, in case of taking a picture of landscape, more lively colors, harder gamma characteristics, and a sharper edge are likely to be preferred. In case of taking a picture of a person, a favorable skin color, softer gamma characteristics, and a softer edge are likely to be preferred. The landscape and people are often photographed together in one scene.

The skin color is an important color especially in terms of image representation. Japanese Patent No. 3387071 (hereinafter, referred to as Patent Document 1), for example, describes video equipment such as a television set or a camera, which tunes the skin color to a predetermined color known as a memory color. More specifically, Patent Document 1 discloses a technique of calculating a level of importance of every region formed of skin-color pixels (skin-color region) and a level of importance of a skin-color image. The level of importance of the skin-color region is defined in such a manner that, the larger the number of skin-color pixels or the closer the position of the region to the center of an image, the higher the value of the skin-color region. The level of importance of the skin-color image is calculated according to the level of importance of the skin-color region. Thus, the level of importance of the skin-color image is defined such that the larger the region of high importance contained in the image, the higher the level of importance. The level of importance of the image containing no skin-color region is set to zero. Many people prefer higher chroma for three primary colors in natural landscape such as blue of sky and green of plants, while preferring relatively lower chroma for a color of human skin, as compared with the above three primary colors in the natural landscape. Thus, it is possible to provide images giving good impression by setting the chroma such that the higher level of importance of the skin-color image the image has, the less the chroma of the skin color while the chroma of colors other than the skin color is constantly multiplied by a fixed number.

However, the technique disclosed in Patent Document 1 cannot provide most appropriately processed images in terms of viewers' point of view, because the chroma of the colors other than the skin color is always multiplied by a fixed number.

Moreover, the technique disclosed in Patent Document 1 cannot perform processing that distinguishes a moving object region and a still object region from each other.

SUMMARY OF THE INVENTION

Therefore, it is an object of the present invention to provide a novel technique for appropriately performing image processing to a moving image.

(1) The present invention discriminates a moving object region and a still object region in a moving image and applies different parameters of image processing of any of color reproduction, a tone, an edge, and a noise to perform image processing to the moving object region and the still object region.

For example, a moving image processing device of the present invention includes: a recognition unit discriminating a moving object region and a still object region in a moving image composed of a captured image; a parameter control unit determining a parameter for image processing of any of a color, a tone, an edge, and a noise; and an image processing unit performing image processing to the captured image according to the parameter, in which the parameter for the image processing to a part or all of the moving object region is different from that for the image processing to a part or all of the still object region.

It is preferable to select for the moving object region a predetermined parameter for color reproduction of a person (e.g., a parameter for getting a skin color closer to a memory color) and to select for the still object region a predetermined parameter for color reproduction of landscape (e.g., a parameter for getting blue and green closer to memory colors of the landscape).

It is also preferable to select for the moving object region a predetermined parameter for tone processing for a person (e.g., a parameter for providing a softer tone and getting a skin color tone richer) and to select for the still object region a predetermined parameter for tone processing for landscape (e.g., a parameter for providing a harder tone and enhancing contrast of the landscape).

It is also preferable to select for the moving object region a predetermined parameter for edge enhancement for a person (e.g., a parameter for realizing softer edge enhancement and softer skin-color reproduction) and to select for the still object region a predetermined parameter for edge enhancement for landscape (e.g., a parameter for realizing stronger edge enhancement and enhancing representation of details of the landscape).

It is also preferable to select for the moving object region a parameter for noise processing for a person (e.g., a parameter for increased noise reduction to reduce noise in a skin portion) and to select for the still object region a predetermined parameter for noise processing for landscape (e.g., a parameter for weakened noise reduction to prevent a failure of representation of details of the landscape).

(2) It is preferable that the recognition unit recognize one or more types of still objects from the still object region and the image processing unit perform image processing to the one or more types of still objects, changing the parameter for each of the one or more types of still objects.

(3) It is preferable that the recognition unit determine whether or not a region of a particular color is the moving object region and the image processing unit perform the image processing, using different parameters depending on whether or not the region of the particular color is the moving object region.

(4) It is preferable that the image processing unit allow a skin color of a person approach to a predetermined memory color when the moving object region is the person.

(5) It is preferable that the moving image processing device further include a parameter input unit inputting parameters at least for both of the moving object region and the still object region, respectively. The parameter input unit has a feature of setting the input parameter to the parameter control unit.

(6) It is preferable to provide a moving image processing method for carrying out image processing equivalent to any of the above (1) to (5).

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DETAILED DESCRIPTION OF THE PREFERRED EMBODIMENTS

An embodiment of the present invention is now described in detail, with reference to the drawings.
[Moving Image Processing Device]

Figure 1:
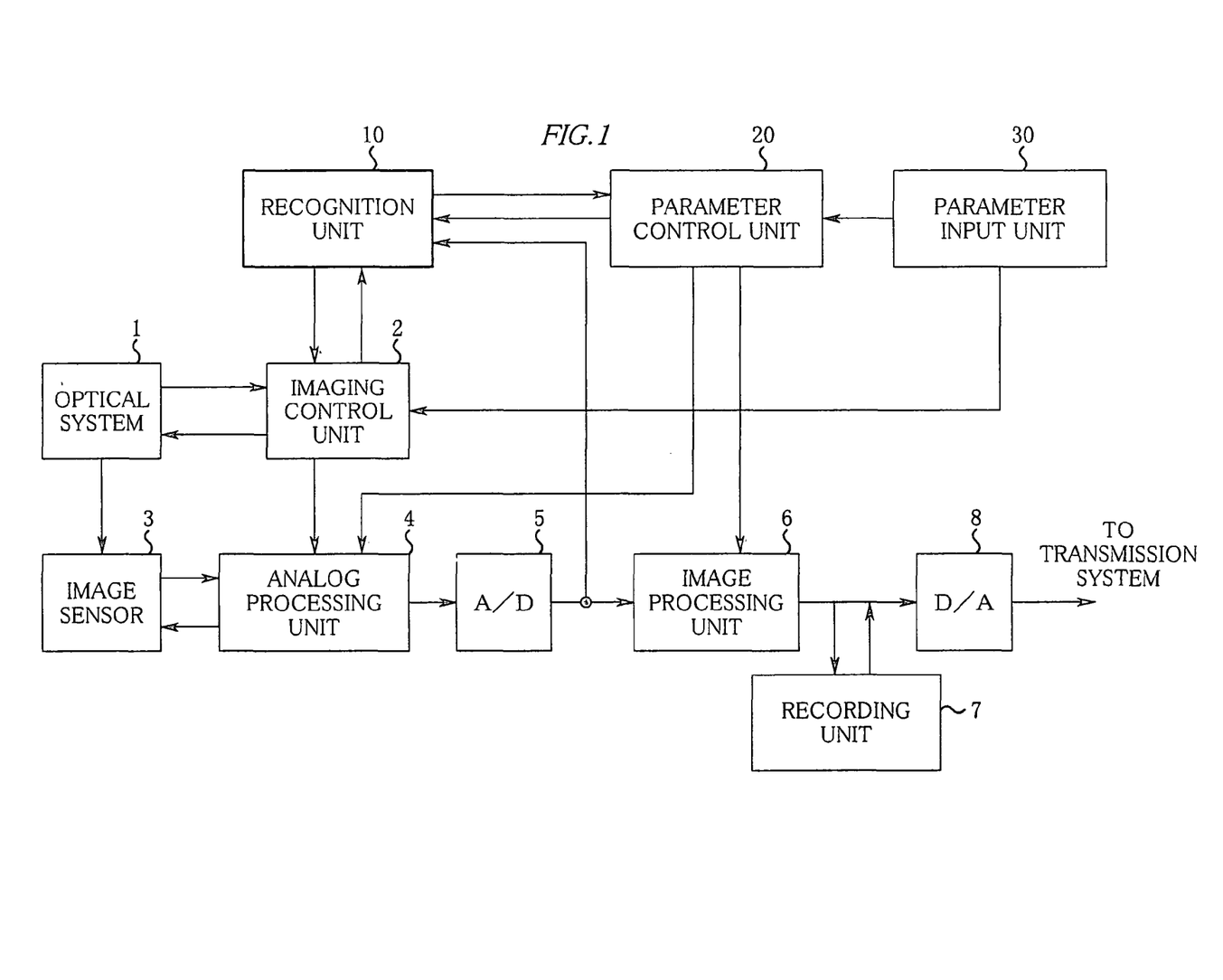
FIG. 1 is a block diagram of a moving image processing device according to the present invention.

FIG. 1 is a block diagram of a moving image processing device.

The moving image processing device allows an optical system 1 to form an image of a subject on an image sensor 3 (e.g., CCD). The image sensor 3 performs photoelectric conversion, so that an imaging signal is input to an analog processing unit 4.

An imaging control unit 2 receives photometric data and the like from the optical system 1 and the like, and controls a shutter speed, a diaphragm of the optical system 1, and the like according to the received data. The analog processing unit 4 performs for a captured image white balance adjustment and other processing according to color-measurement results of the photometric data and of an image captured for a monitor.

The imaging signal output from the analog processing unit 4 is converted into a digital signal by an analog-to-digital converter (A/D) 5. An output of the A/D 5 is input to an image processing unit 6 (that is a processing unit including an operation unit, a memory, input and output ports, and the like and operates in accordance with an image processing program).

An output of the image processing unit 6 is recorded onto a recording unit 7 (e.g., a semiconductor memory such as a flash memory, an optical memory, or an ultracompact magnetic disk).

The output of the image processing unit 6 is converted into an analog signal by a digital-to-analog converter (D/A) 8 and is then output to the outside.

A recognition unit 10 receives as its input the digital imaging signal output from the A/D 5 and detects a moving object. The moving object here refers to an object that is moving with respect to a surrounding environment.

The recognition unit 10 accepts velocity data, acceleration data, and the like of the moving image processing device from the imaging control unit 2, thereby eliminating effects of motion of an entire image caused by panning or zooming, fluctuation of the entire image caused by hand movement, fluctuation of background caused by wind and the like. In order to eliminate the above effects a threshold value for the moving amount may be set. In this case, an object is recognized as a still object when the moving amount thereof is equal to or smaller than the set threshold value. In other words, the recognition unit 10 recognizes a moving region, upon canceling the motion of the entire moving image based on movement information obtained from an acceleration sensor or the like when the entire image is a moving image due to panning in which the optical system 1 is moved right and left or panning-up or panning-down in which the optical system 1 is moved up or down, for example, and based on control information related to zooming obtained from the imaging control unit 2 when the optical system 1 is zooming. The recognition unit 10 may recognize both of the moving object and the still object. In this case, the recognition unit 10 can surely recognize the moving object portion. The recognition unit 10 then outputs coordinate information on a coordinate of the recognized moving object region to a parameter control unit 20.

The parameter control unit 20 determines the coordinate of the moving object region and a parameter for image processing (e.g., color correction, tone correction, and edge enhancement) and outputs them to the image processing unit 6. A parameter for image processing to a part or all parts of the moving object region is different from a parameter for image processing to a part or all parts of the still object region. Thus, the parameter control unit 20 specifies a coordinate of every portion of each of the regions and changes the parameter for image processing to every portion.

The parameter control unit 20 also sends the parameter for image processing to the analog processing unit 4. For example, the analog processing unit 4 changes gains respectively set for R, G, and B outputs of the image sensor 3 according to the parameter for image processing, thereby performing preliminary white balance adjustment. Such preliminary adjustment can reduce a load on the image processing unit 6.

A parameter input unit 30 receives a desired parameter for image processing inputted by a user and outputs it to the parameter control unit 20. The thus input parameter is output from the parameter control unit 20 to the recognition unit 10, the analog processing unit 4, and the image processing unit 6.

The parameter input unit 30 also outputs the input parameter for image processing to the imaging control unit 2. The reason for outputting the parameter for image processing to the imaging control unit 2 is that a user may want to discriminate subjects that are different in the moving amount such as a car and a person from each other. Thus, the parameter may be input by selecting a color, a shape, and a speed of the subject, for example, "red"+"car"+"fast." In this example, the analog processing unit 4 makes a control of increasing a gain of an R (red) signal for a moving object region corresponding to a red car. In this manner, an imaging condition is set in advance in accordance with the user's desired image processing. Thus, the load on the image processing unit 6 can be reduced.

The image processing unit 6 performs image processing, using a default parameter stored in its memory or the parameter input from the parameter input unit 30 in custom setting.

[Parameter for Image Processing]

Image processing performed by the moving image processing device includes color correction (white balance adjustment, chroma correction, hue correction, and the like), tone correction, edge enhancement, noise reduction, and the like.

Color correction is performed in order to correct color mixture occurring in the optical system 1 and achieve ideal imaging characteristics. Typical known color correction techniques include a linear matrix operation for input R, G, and B signal values and a chroma correction for independently adjusting six colors of R, G, and B and three complementary colors of cyan, magenta, and yellow. In order to input the parameter in these color correction techniques, it is only necessary to specify a color and then select a color measuring value or a memory color (i.e., a typical color of a familiar object which people tend to think of) for the specified color. Then, the parameter control unit 20 sets the parameter in accordance with the aforementioned techniques.

Tone correction is performed for compensating brightness characteristics of an image display device. For example, a cathode-ray tube has characteristics in which its brightness output corresponds to its input signal raised to the power of 2.2. Therefore, the output of the cathode-ray tube is made linear by performing tone correction with the power of 1/2.2 in order to achieve faithful output characteristics. Moreover, in tone correction, a slope in a shadow portion and a highlight portion is made gentler while a slope in an intermediate portion is made steeper (this tone is typically called as a hard tone). Alternatively, the slope in the intermediate portion is made gentler (this tone is typically called as a soft tone). In addition, an intermediate tone may be set between the hard tone and the soft tone. As described above, a parameter for tone correction quantitatively or qualitatively specifies correction for a part or all of the shadow portion, a linear portion, and the highlight portion. In case of quantitative specification, the parameter is input by selecting a tone value or the like by a button operation. In case of qualitative specification, for example, in the case where only a "soft tone" is specified, "soft tone" correction is carried out of which details are stored in the moving image processing device by default.

Edge enhancement is image processing that extracts and enhances edge components of a picture and adds the enhanced edge components to the original picture in order to improve apparent resolution. Since edge enhancement is specified by the parameter, it is only necessary to select any of three levels (weak, intermediate, and strong) as the edge of the picture becomes sharper, for example.

[Moving Image Processing Method]

Figure 2:
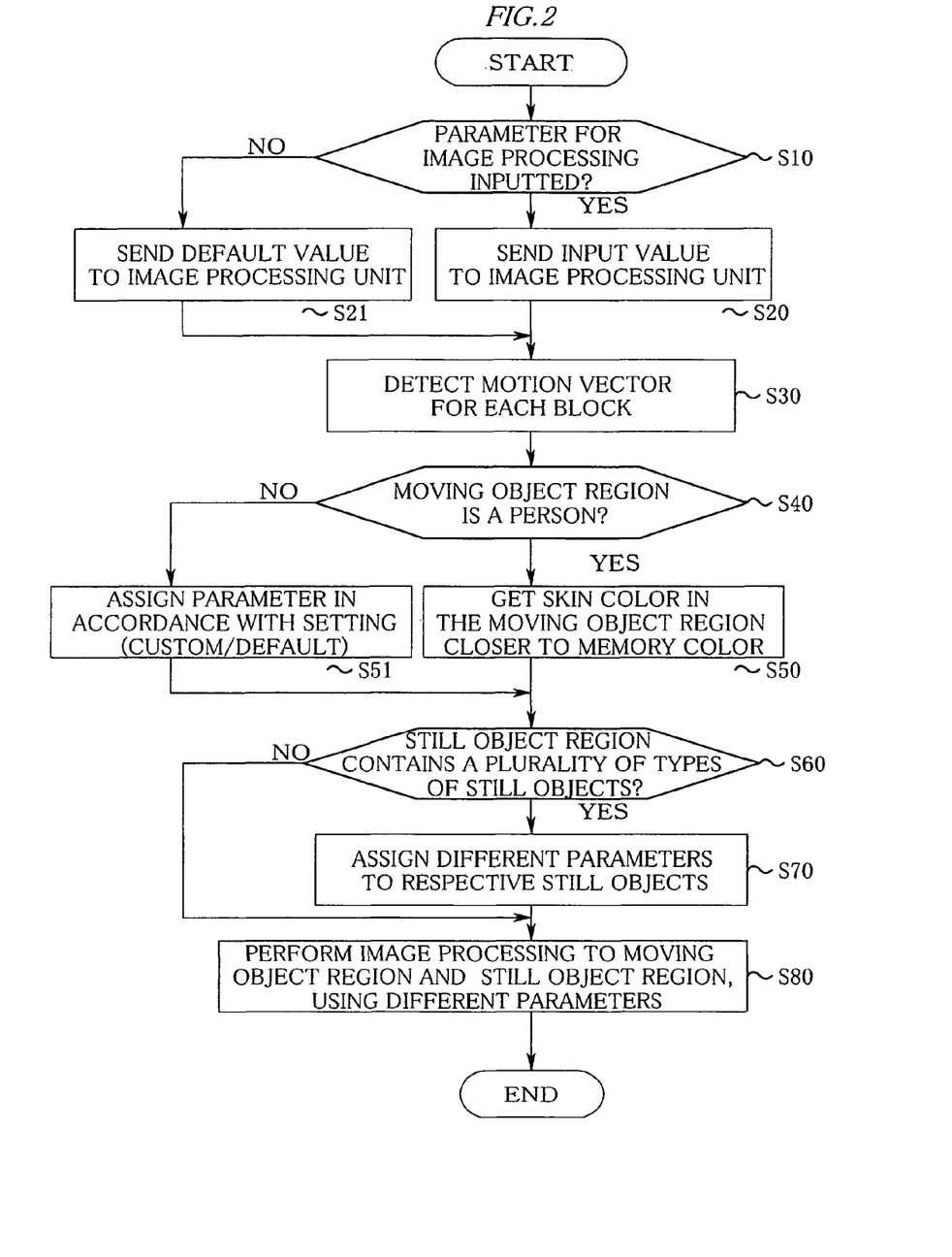
FIG. 2 is a flowchart that explains an operation of the moving image processing device.

FIG. 2 is a flowchart that explains a moving image processing method.

The flowchart is roughly divided into recognition steps (S10 to S30) in which a captured image is divided into blocks and a motion vector is detected for each block, and parameter control and image processing steps (S50 to S80) in which image processing is performed with one parameter for a moving object region including the block for which the motion vector has been detected and that image processing is performed with another parameter for a still object region. Among the above steps the recognition steps are known.

Respective steps of the flowchart are now described in detail.

In Step S10, the parameter input unit 30 determines whether or not a parameter for image processing is input.

When the parameter for image processing is input in Step S10, a procedure proceeds to Step S20 where a value of the input parameter is output to the parameter control unit 20 or the imaging control unit 2.

On the other hand, when the parameter for image processing is not input in Step S10, the procedure proceeds to Step S21 where the parameter control unit 20 outputs a default value of the parameter for image processing to the recognition unit 10, the analog processing unit 4, and the image processing unit 6. In the case where image processing can be performed only with a default value stored in the image processing unit 6, the parameter control unit 20 is not used.

After Step S20 or S21, in Step S30, one frame of the captured image is divided into a plurality of blocks (each of which is formed by 16×16 pixels, for example). The recognition unit 10 then recognizes a moving object and a still object from a motion vector for each block. A known video matting method, a method that uses a difference between an object and a background image (see Japanese Unexamined Patent Application Publication No. 4-216181, for example), and a dynamic edge method (see Japanese Unexamined Patent Application Publication No. 10-21408, for example) can be used for recognition.

Next, the recognition unit 10 determines whether or not the moving object is a person in Step S40. More specifically, the recognition unit 10 detects eyebrows, a mouth, eyes, and the like and then determines whether or not the moving object is a person based on a positional relationship among the detected components. Alternatively, the determination may be carried out by detecting a skin color. Alternatively, the determination may be carried out according to both of portions of a person's face and the skin color.

When the moving object is determined as a person in Step S40, the procedure proceeds to Step S50 where a skin color in the moving object region (i.e., moving person) is made closer to an appropriate skin color that is close to a memory color. In Step S50, tone correction and edge enhancement that are suitable for a person may also be performed. The recognition unit 10 outputs a block number of the moving object region (region information) to the image processing unit 6 via the parameter control unit 20 in order to allow the image processing unit 6 to perform the aforementioned image processing.

On the other hand, when the moving object is not a person in Step S40, the procedure proceeds to Step S51. In Step S51, the parameter for image processing to the moving object region is set to the same parameter for image processing to background or a parameter for image processing set in advance as custom setting (e.g., a parameter for a car specifying high chroma, a hard tone, or an enhanced edge). The recognition unit 10 outputs the block number of the moving object region (region information) to the image processing unit 6 via the parameter control unit 20 in order to allow the image processing unit 6 to perform the image processing.

After Step S50 or S51, the recognition unit 10 determines whether or not the still object region (background) includes a plurality of types of still objects in Step S60. For example, when the background contains greenery and blue sky, it determines that there are two types of still objects. This determination is performed mainly based on color discrimination (collaterally based on shape discrimination).

When the recognition unit 10 has determined that there are a plurality of types of still objects in Step S60, the procedure proceeds to Step S70 where the parameter control unit 20 assigns parameters of image processing that are different between different types of still objects to the respective types of still objects. One or more of still objects may be selected and different parameters of image processing may be assigned to the selected still objects, respectively. Thus, in Step S80, the image processing unit 6 performs image processing to the moving object region (subject) and the still object region (background) containing a plurality of still objects with different parameters, respectively.

On the other hand, when the recognition unit 10 has determined that there is one type of still object in Step S60, the procedure proceeds to Step S80. In Step S80, image processing to a part or all of the moving object region is performed with a certain parameter based on the coordinate information from the parameter control unit 20, and image processing to a part or all of the still object region is performed with another parameter based on the coordinate information from the parameter control unit 20.

[An Example of Implementation]

[Default Setting of a Parameter for Image Processing]

In order to perform moving image processing using default setting, a default moving image parameter is stored in advance in a memory of the parameter control unit 20 or image processing unit 6.

The default value may be determined considering a typical purpose of taking a moving image, so that the moving object region targets at a person and the still object region targets at landscape. More specifically, parameters for the still object region are determined to perform color correction tuned to a skin color and provide soft tone characteristics and soft edges, while parameters for the moving object region are determined to perform color correction for obtaining high chroma and provide hard tone characteristics and clear edges. Moreover, different parameter for image processing between sky and plants, for example, may be set as default values.

Figure 3:
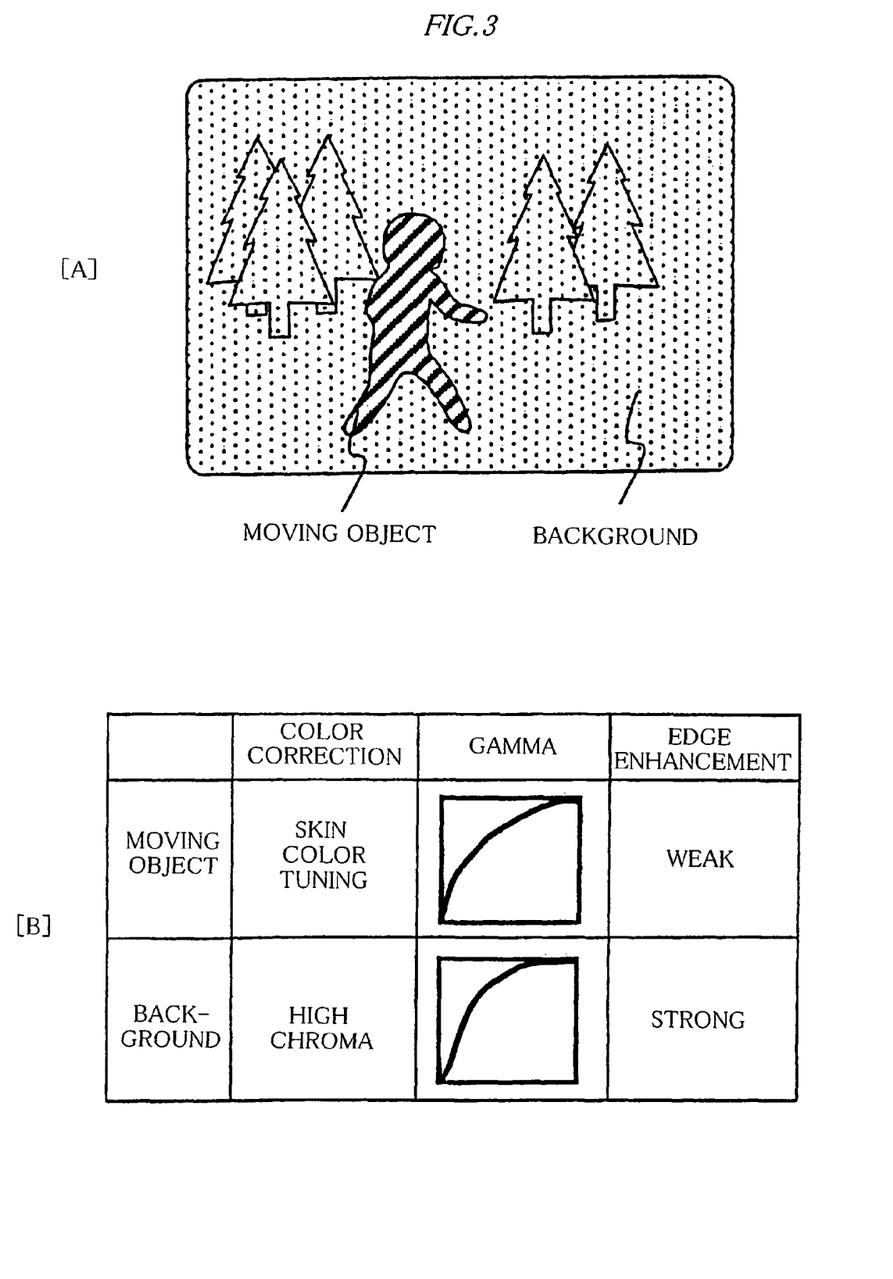
FIGS. 3A and 3B show an exemplary captured image and exemplary image processing parameters in default setting.

Referring to FIGS. 3A and 3B, a relationship between a captured image and the default setting is described.

A moving object shown in FIG. 3A is a walking person. As shown in FIG. 3B, for the moving object, color correction is tuned to a skin color, tone characteristics are set to provide a soft tone, and weak edge enhancement is performed. Moreover, a portion of the person having a color other than the skin color may be recognized and subjected to image processing.

On the other hand, there is no moving object in background (still object region) in FIG. 3A. In the exemplary image processing shown in FIG. 3B, for a background portion of the captured image, color correction is performed to provide high chroma, tone correction is performed to provide hard tone characteristics, and strong edge enhancement is performed. Especially, in the case where color correction, tone correction, and edge enhancement are set to be different between sky and plants, for example, in default setting, it is possible to more precisely reflect a viewer's preference in image representation.

[Custom Setting of a Parameter for Image Processing]

Next, custom setting of the parameter for image processing is described.

First, when a user inputs a parameter for custom setting to the parameter input unit 30, an input value of the parameter is output to the image processing unit 6 via the parameter control unit 20 and then image processing is performed. The input value is also input to the imaging control unit 2 directly, and the optical system 1 and the image sensor 3 are adapted to desired image processing before image processing is performed.

In the case where color correction, tone correction, and edge enhancement are made different depending on a person, sky, plants, landscape, and the like in custom setting, it is possible to more precisely reflect a viewer's preference in image representation.

Figure 4:
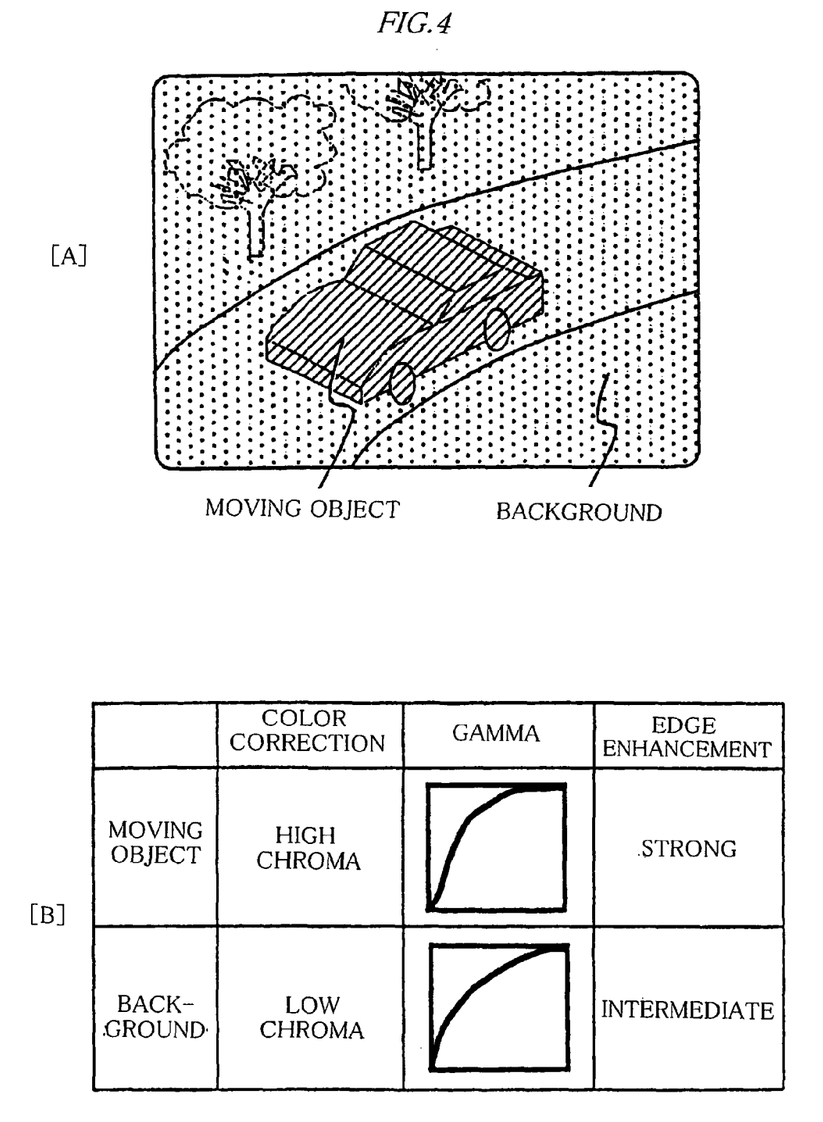
FIGS. 4A and 4B show an exemplary captured image and exemplary image processing parameters in custom setting.

Referring to FIGS. 4A and 4B, a relationship between a captured image and the custom setting is described.

A moving object shown in FIG. 4A is a moving car. In exemplary image processing shown in FIG. 4B, the entire moving object is tuned to high chroma and is processed to provide high tone characteristics and strongly enhanced edges. It is possible to recognize a portion of background having a particular color and perform image processing to the portion. On the other hand, there is no moving object in the background (still object region) shown in FIG. 4A. In the exemplary image processing shown in FIG. 4B, for the entire background, color correction is performed to provide low chroma, tone correction is performed to provide soft tone characteristics, and an intermediate level of edge enhancement is performed. It is possible to recognize a portion of the background having a particular color and perform image processing to the portion.

Image processing is not limited to the examples shown in FIGS. 3A, 3B, 4A, and 4B. In the case where the still object region is an old street, for example, image processing may be performed to provide low chroma and a soft tone, unlike the shown examples. In this case, it is possible to expand a range of image representation.

As described above, in the custom setting, an optimum parameter for image processing is determined by selecting an object such as a person, a car, or landscape and then selecting a direction of image processing such as soft or clear. When object selection and/or direction selection are/is diversified, it is more precisely reflect a viewer's preference in image representation. Moreover, more desirable image can be obtained by allowing levels of color correction, tone correction, and edge enhancement to be independently selected.

The invention is not limited to the above embodiments and various modifications may be made without departing from the spirit and scope of the invention. Any improvement may be made in part or all of the components.

What is claimed is:

1. A moving image processing device comprising:
   a recognition unit discriminating a moving object region and a still object region in a moving image composed of a captured image and determining whether or not a subject of the moving object region is a person;
   a parameter control unit determining a combination of parameters for each image processing, the parameters being a color, a tone, and an edge; and
   an image processing unit performing the image processing to the captured image according to the parameters, wherein
   the parameter control unit changes a combination of the parameters to be performed on at least part of the moving object region from a combination of the parameters to be performed on at least part of the still object region, and changes the combination of the parameters to be performed on the still object region depending on a determination result of whether or not the moving object region is the person.

2. The moving image processing device according to claim 1, wherein:
the recognition unit recognizes one or more types of still objects from the still object region; and
the image processing unit performs the image processing to the one or more types of still objects, changing the parameters for each of the one or more types of still objects.

3. The moving image processing device according to claim 1, wherein:
when the moving object region is the person, the image processing unit allows a skin color of the person to approach to a predetermined memory color.

4. The moving image processing device according to claim 3, wherein
when the moving object region is the person, the image processing unit:
sets tone characteristics to provide a soft tone and performs weak edge enhancement for the moving object region; and
performs color correction to provide high chroma, sets the tone characteristics to provide a hard tone and performs strong edge enhancement for the still image region.

5. The moving image processing device according to claim 1, further comprising
a parameter input unit inputting the parameters at least for the moving object region and the still object region, wherein
the parameter input unit sets the input parameters to the parameter control unit.

6. A moving image processing method comprising the steps of:
discriminating a moving object region and a still object region in a captured image;
determining whether or not a subject of the moving object is a person;
determining a combination of parameters for each image processing, the parameters being a color, a tone, and an edge; and
performing the image processing to the captured image according to the parameters, wherein
the parameters determining step changes a combination of the parameters to be performed on at least part of the moving object region from a combination of the parameters to be performed on at least part of the still object region, and changes the combination of the parameters to be performed on the still object region depending on a determination result of whether or not the moving object region is the person.

7. The moving image processing method according to claim 6, wherein:
in the discriminating step, one or more types of still objects are recognized from the still object region; and
in the image processing performing step the image processing is performed to the one or more types of still objects, changing the parameters for each of the one or more types of still objects.

8. The moving image processing method according to claim 6, wherein:
when the moving object region is the person, the image processing performing step allows a skin color of the person to approach to a predetermined memory color.

9. The moving image processing method according to claim 8, wherein
when the moving object region is the person, the image processing performing step:
sets tone characteristics to provide a soft tone and performs weak edge enhancement for the moving object region; and
performs color correction to provide high chroma, sets the tone characteristics to provide a hard tone and performs strong edge enhancement for the still image region.

10. The moving image processing method according to claim 6, further comprising the step of
inputting and setting the parameters at least for the moving object region and the still object region.

* * * * *